United States Patent [19]
Sanders et al.

[11] Patent Number: 5,437,489
[45] Date of Patent: Aug. 1, 1995

[54] FLUID-OPERATED PIPE CLAMP

[76] Inventors: Jesse R. Sanders, 906 Whitestone, Houston, Tex. 77073; Larry R. Russell, 6710 Stroud, Houston, Tex. 77074

[21] Appl. No.: 161,311

[22] Filed: Dec. 3, 1993

[51] Int. Cl.⁶ .......................................... F16L 55/168
[52] U.S. Cl. .......................................... 294/88; 138/99; 294/66.1; 294/106; 901/37; 901/39
[58] Field of Search ................ 294/66.1, 88, 90, 91, 294/104, 106, 110.1, 119.2; 138/97, 99; 285/15; 405/158, 172; 901/37, 39

[56] References Cited

U.S. PATENT DOCUMENTS

| | | | |
|---|---|---|---|
| 2,684,166 | 7/1954 | De Jarnett | 294/90 X |
| 2,695,189 | 11/1954 | Chrisman et al. | 294/90 |
| 3,744,822 | 7/1973 | Arnold | 138/99 X |
| 4,441,328 | 4/1984 | Brister | 138/97 X |
| 4,441,749 | 4/1984 | Blaschke et al. | 294/90 X |
| 4,535,822 | 8/1985 | Rogers | 138/99 |
| 4,756,338 | 7/1988 | Guyatt et al. | 138/99 |
| 5,297,584 | 3/1994 | Goad et al. | 138/99 |

*Primary Examiner*—Johnny D. Cherry
*Attorney, Agent, or Firm*—William A. Knox

[57] ABSTRACT

This invention provides a hydraulically-actuated pipe clamp for sealing leaks in pipe lines located in remote or hazardous places. The pipe clamp consists of a split block having hinged jaws that may be clamped around a pipe by a hydraulic actuator. The jaws are then mechanically latched in place so that the clamp will remain closed after the hydraulic source has been disconnected.

5 Claims, 4 Drawing Sheets

FLUID-OPERATED PIPE CLAMP

BACKGROUND OF THE INVENTION

1. Field of the Invention

The pipe clamp of this invention is designed for underwater use or for other remotely-located applications by a robotic device. The purpose of the clamp is to seal pipeline leaks.

2. Discussion of Related Art

A pipe clamp is a device for repairing a localized leak in the wall of a pipe without the need for replacing the pipe. A pipe clamp consists essentially of a resilient gasket that is placed over the leak. A two-piece cylindrical clamp is fitted over the pipe and gasket whereupon the two pieces are bolted together, using four or more bolts and nuts. When bolted together, the clamps cause the gasket to seal off the hole in the pipe. The advantage of such devices is that the pipeline need not be taken out of service and the repair response time is virtually instantaneous. Pipe clamps typically are made to fit specific standard pipe sizes although some devices are made to be adjustable over a limited range of different sizes.

Pipe clamps of the type described are commonly used in land-based applications and underwater by divers. However, in extremely deep water, beyond normal divers' capability, manned submarines and/or robots are used for pipeline maintenance work. As pointed out previously, pipe-clamp halves are normally bolted together over a leak. It so happens that, despite their usefulness, the manipulator arms of submarines or robots cannot efficiently thread together a nut and a bolt.

There is a need for a pipe clamp for underwater or remote use that can be handled efficiently by the manipulator arms of a submarine or robot.

SUMMARY OF THE INVENTION

The pipe clamp of this invention consists of a split block having a bore, the split block being characterized by two jaws hinged together. A first hydraulic two-position piston interconnects the two jaws of the split block. In a first position, the piston spreads apart the two hinged-together jaws of the split block to permit the clamp to be located over a desired portion of a pipe of preselected size. In a second position, the piston closes the two jaws around the pipe. When closed, the bore is sized to fit snugly around the pipe such that sealing rings, mounted internally of the bore, seal off products exuding from the pipe. When said split block is closed, a second hydraulic piston provides means for mechanically latching the two hinged jaws of the split block in place.

In an aspect of this invention, means are provided for grasping and manipulating the pipe clamp over a desired position on a pipeline by a submarine robot. Means are provided for connecting said first and second hydraulic pistons to a source of pressurized fluid mounted in/on the robot and for automatically disconnecting the pistons after the hinged halves of the split block have been locked in place.

Means are provided for closing the jaws and operating the latching members according to a desired sequence.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
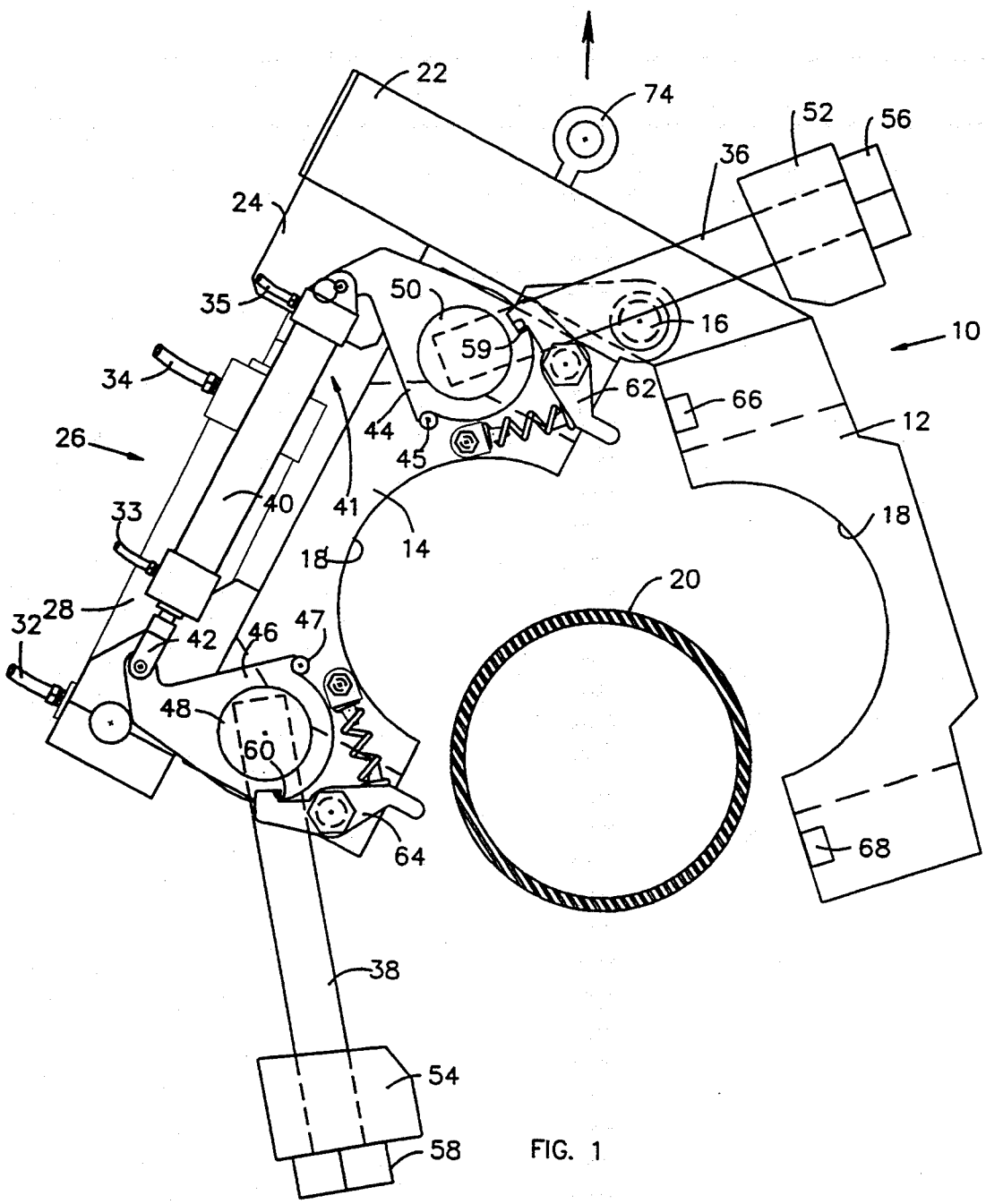
FIG. 1 is an axial view of the hydraulic pipe clamp in the open position.

FIG. 1 shows a hydraulically-actuated pipe clamp 10 in the open position. It should be understood that the term "hydraulic" as used in this disclosure for the sake of convenience, is synonymous with the term "pneumatic"; that is, the actuating fluid may be a liquid or a gas without limitation or preference as to which fluid to use.

Pipe clamp 10 includes a split block consisting of two jaws 12 and 14 that are hinged together on one side by hinge 16. Each jaw has a semi-cylindrical cutaway portion 18 and 18' which, taken together when the halves are closed, (FIGS. 2A and 2B) form a cylindrical bore 19 for encircling a pipe such as 20. The diameter of the bore 19 is sized to match the nominal diameter of the pipe 20 under consideration.

Figure 2A:
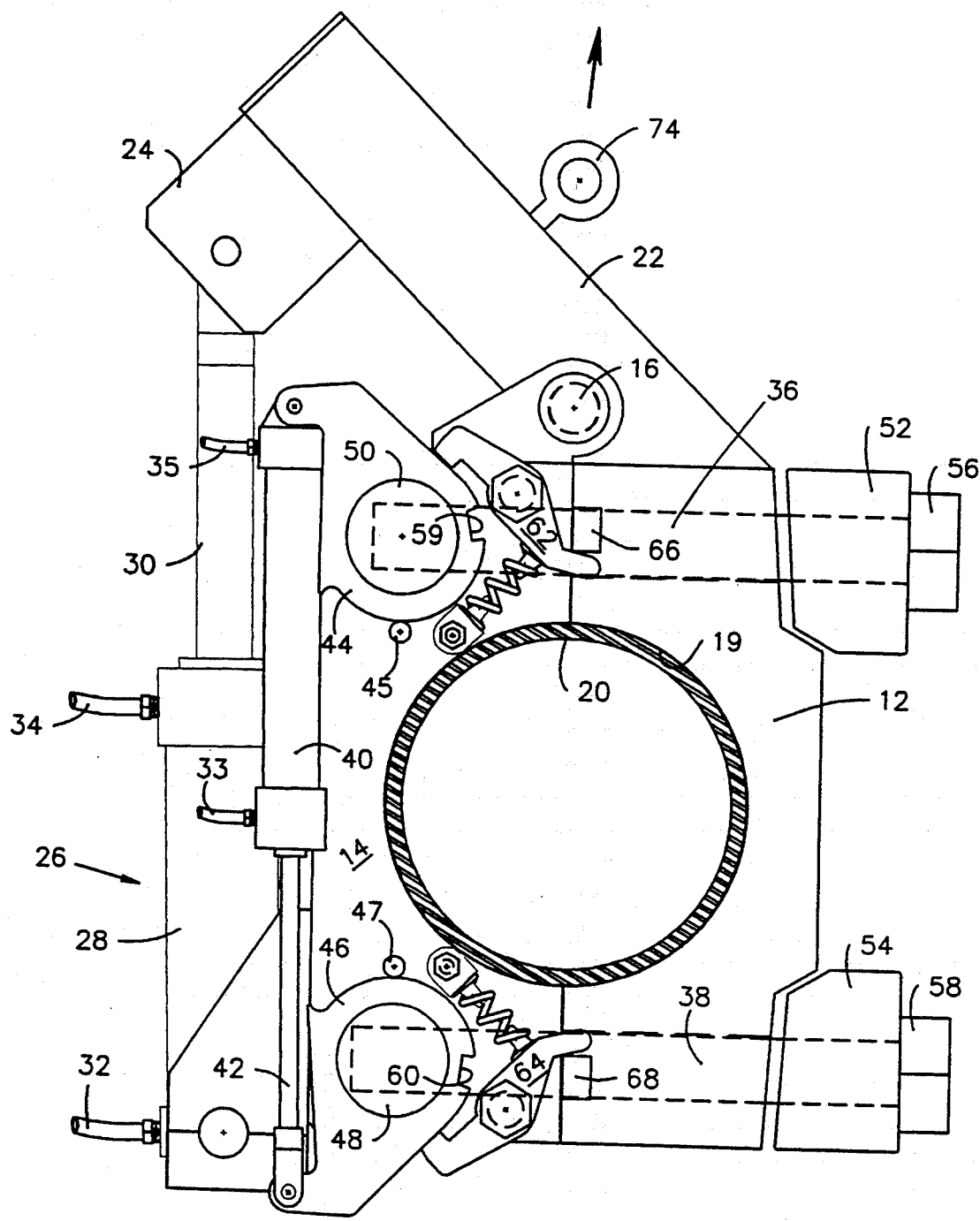
FIG. 2A is an axial view of the pipe clamp in the closed position but loosely latched.

An arm 22 extends diagonally from jaw 12; a lug 24 terminates the opposite end of arm 22. It is to be observed that the fulcrum for hinge 16 is offset to arm 22. A first hydraulic means such as a two-way hydraulic actuator 26 having a cylinder portion 28 is secured to jaw 14. A suitable actuator may be a NFPA type MP1 hydraulic cylinder, clevis mount having a 3000 psi operating pressure. The piston rod portion 30 of actuator 26 is secured to lug 24. When fluid pressure is applied to actuator 26 through pressurized fluid line 32, piston 30 extends to cause the jaw 12 closes against jaw 14 around pipe 20 as shown in FIG. 2A. When pressurized fluid is applied to line 34, piston 30 retracts, opening jaws 12 with respect to jaw 14 as shown in FIG. 1.

Figure 2B:
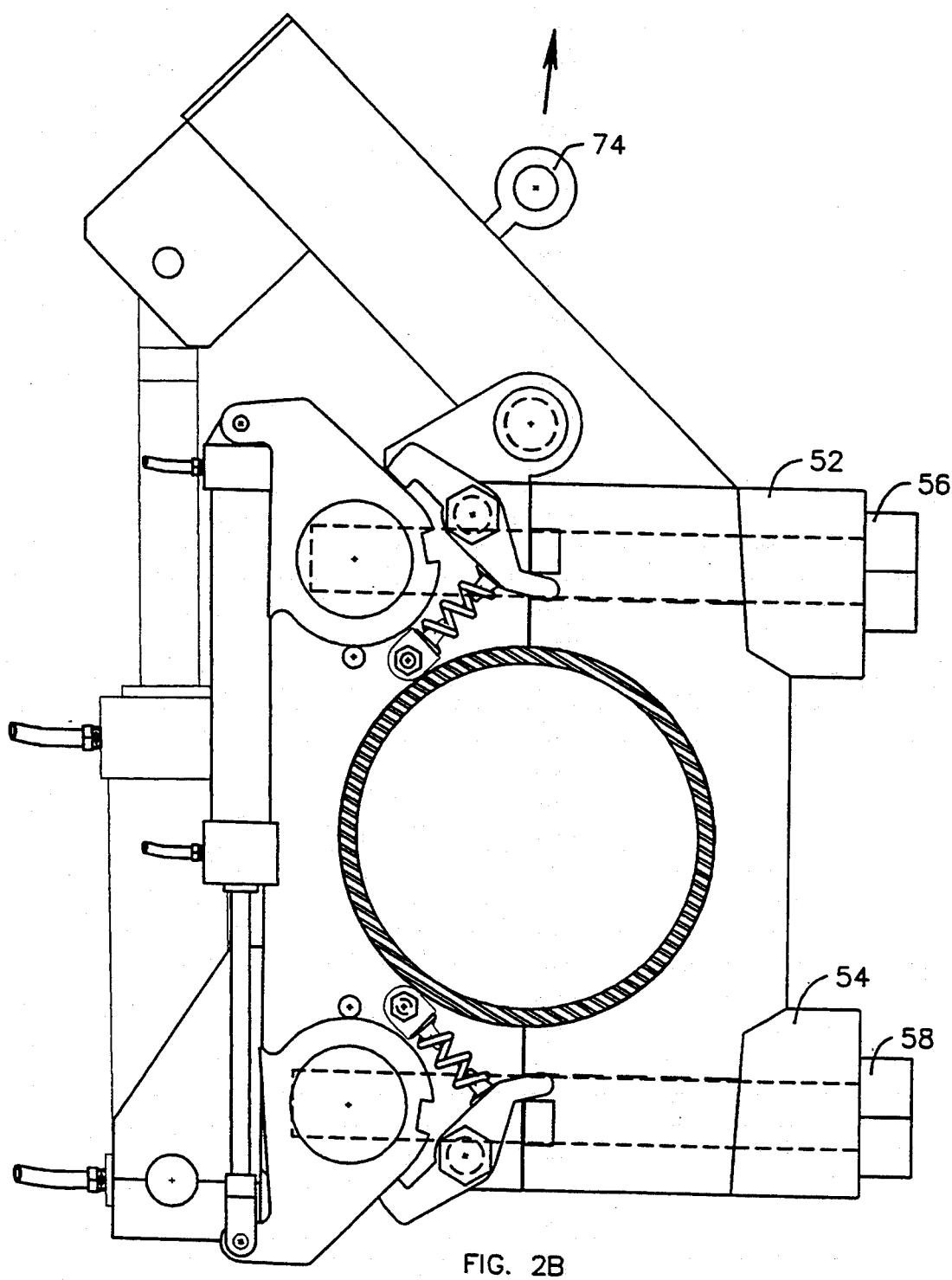
FIG. 2B is the axial view of FIG. 2a but tightly latched.

Having closed the jaws 12 and 14 around a desired portion of pipe 20, it is now necessary to latch the jaws in place so that when the hydraulic source has been disconnected, the clamp will retain its integrity. Latching is accomplished by swing arm assemblies 36 and 38. After jaws 12 and 14 have closed, swing arms 36 and 38 are rotated by a second hydraulic actuator means 41 consisting of cylinder 40 and piston 42 which are connected between rotator arms 44 and 46. Piston 42 is extended by application of pressurized fluid through fluid line 35 and retracted by application of pressurized fluid through fluid line 33. A suitable actuator is NFPA style MT2, blind end, trunnion mount hydraulic cylinder, also rated at 3000 psi operating pressure. Rotator arms 44 and 46, mounted at one end of jaw 14, are coupled to swing arm assemblies 36 and 38 via shafts 48 and 50. Stops 45 and 47 limit rotary travel of rotator arms 44 and 46. After swing arm assemblies 36 and 38 have rotated into place over the closed jaws, latch members 52 and 54 are biased outwardly by springs such as 53 (shown in FIG. 3 but hidden in the other Figures) so that the latch members will clear the edges of jaws 12 and 14 as shown by the loosely-latched configuration of FIG. 2A. The latch members 52 and 54 are then clamped against each side of jaw 12 by tightening bolts 56 and 58 as shown in FIG. 2B. In an alternate embodiment, a wedge-type member driven by suitable hydraulic pistons inserted between latch members 52 and 54 and the heads of bolts 56 and 58 could serve the same function as the act of tightening bolts 56 and 58, thus avoiding the need for use of a wrench.

First and second hydraulic actuators 26 and 40 are connected to the pressure lines in parallel by means of a suitable manifold of any desired type (not shown). That is, when pressure is applied, the actuator pistons extend or retract in unison. However, it is evident that the swing arms cannot be deployed into position until the jaws 12 and 14 first become fully closed or nearly so. Therefore, the operation of jaw closing and jaw latching is mechanically sequenced. Rotator arms 44 and 46 are provided with detents 59 and 60 (best seen in FIGS. 2A or 2B). Spring-loaded trigger arms 62 and 64 engage detents 58 and 60 when the jaws 12 and 14 are open. Upon first application of fluidic pressure to lines 32 and 35, piston 30 of actuator 26 extends to initiate jaw closing. Although pressure is also being applied to line 35 of actuator 41, swing arm assemblies 36 and 38 are initially inhibited from moving because rotator arms 44 and 46 are held in place by triggers 62 and 64 that engage the detents 58 and 60. As jaw 12 starts to close, a protruding nipple 66 mounted on the face of the opposed jaw 12 trips the trigger 62 to disengage it from detent 58 so that actuator 40 now can rotate swing arm assembly 36 to the latching position. As jaw 12 finally completes its closure, nipple 68 trips the other trigger 64 to disengage it from detent 60 of rotator arm 46 so that the other swing arm assembly 38 can now close. To provide adequate clearance while being rotated into position, latch members 52 and 54 are outwardly spring-biased by a small amount as shown in FIG. 1 and more particularly in FIG. 2A.

Figure 3:
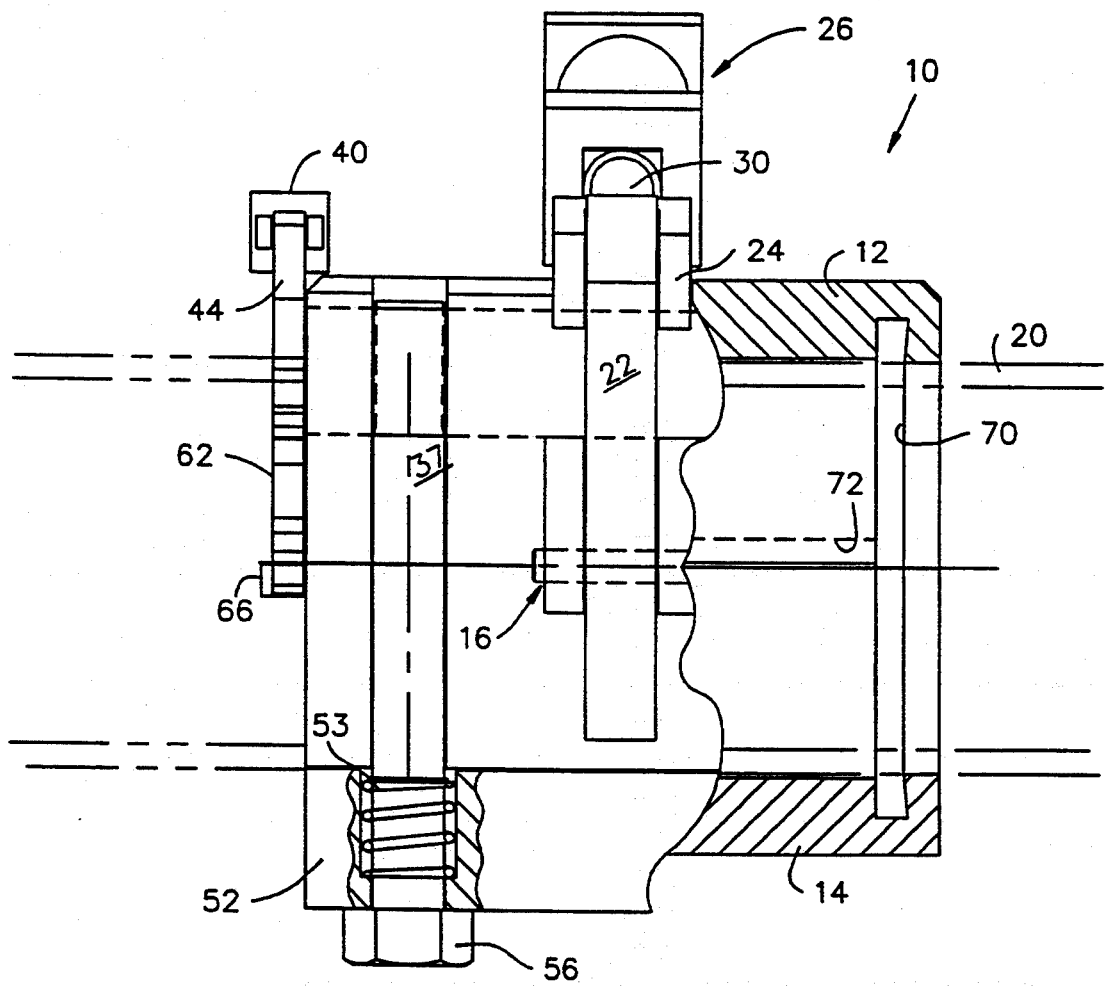
FIG. 3 is a side view looking down from the top of the closed pipe clamp as seen in FIGS. 2a and 2b.

FIG. 3 is a side view, partly cutaway, of the pipe clamp 10 looking down from the top of FIGS. 1, 2A and 2B. There are two swing arms for each swing arm assembly such as 36 although in FIG. 3, only the left hand swing arm 37 is shown; the right hand swing arm has been cut away to show certain interior details of jaws 12 and 14. At each end of both jaws, a circumferential groove 70 is provided into which a split rectangular rubber sealing gasket is introduced. A longitudinal groove 72 in jaw 12 is also provided for a longitudinal seal. When the pipe clamp 10 is emplaced over a desired portion of a leaking pipe and latched in place, the rubber gaskets seal in the leaking product.

A hoisting ring 74 is provided so that the pipe clamp 10 may be conveniently handled by the manipulator arm of a robot or submarine of any desired type. A manifold (not shown) is provided for distributing pressurized fluid to the respective hydraulic actuating means. The manifold may be provided with a quick-disconnect fitting for connection/disconnection to a source of pressurized fluid associated with the robot.

In operation, the pipe clamp 10, configured in the open position, is suspended by its handling ring 74 from the manipulator arm of the selected robotic device prior to its deployment into the medium in which a leaking pipe is immersed, such as beneath the sea. Hydraulic lines interconnect a pressure source with the manifold on the pipe clamp assembly 10. Before deploying the pipe clamp, the robotic device has made preparatory trips to jet mud and debris away from the area of interest around the pipeline. With the jaws open, the robotic device maneuvers the clamp assembly 10 over the preselected portion of the pipe line 20. The jaws are closed and latched whereupon the robotic device automatically disconnects the pressure lines by withdrawing and remaneuvering to tighten the latch members 52 and 54 to complete the installation. As before stated, the latch members may be tightened either by bolts as shown or by suitable hydraulic pistons acting against a slotted wedge mounted between latch members 52 and 54 and the heads of the respective bolts 56 and 58.

This invention has been described with a certain degree of specificity by way of example but not by way of limitation. For instance, the application has been described with respect to the marine environment. It could of course be used in the space environment or in hazardous areas closed to human occupancy.

What is claimed is:

1. A hydraulically-actuated pipe clamp for manipulation by a robot, comprising:

a split block, having a bore, said split block consisting of two hinged-together jaws;

a first double-acting hydraulic means for spreading apart the hinged-together jaws of said split block to allow positioning said split block over a desired portion of a pipe having a preselected diameter and for clamping the hinged-together jaws of said split block around said pipe;

a second double-acting hydraulic means for rotating a first and a second latching means over said jaws when clamped around said pipe to confine said jaws to a clamped configuration.

2. The hydraulically-actuated pipe clamp as defined by claim 1, wherein:

said bore is sized to match the preselected diameter of said pipe.

3. The hydraulically-actuated pipe clamp as defined by claim 2, comprising:

a plurality of grooves for receiving split sealing rings mounted internally of said bore.

4. The hydraulically-actuated pipe clamp as defined by claim 3, comprising:

means for releasable securing said hydraulically-actuated pipe clamp to a robot;

means for connecting said first and second double-acting hydraulic means to a source of pressurized fluid; and means for disconnecting said first and second double-acting hydraulic means from said source when said hinged jaws of said split block are latched and said robot withdraws.

5. The hydraulically-actuated pipe clamp as defined by claim 1, comprising:

means for closing said jaws and rotating said first and second latching means into a latching position according to a preselected mechanical operational sequence.

* * * * *